(12) United States Patent
Cunningham

(10) Patent No.: US 6,595,483 B2
(45) Date of Patent: *Jul. 22, 2003

(54) VIBRATION ISOLATION DEVICE AND METHOD

(76) Inventor: John Cunningham, 35 Loughberry Rd., Saratoga Springs, NY (US) 12866

(*) Notice: Subject to any disclaimer, the term of this patent is extended or adjusted under 35 U.S.C. 154(b) by 0 days.

This patent is subject to a terminal disclaimer.

(21) Appl. No.: 09/785,073

(22) Filed: Feb. 16, 2001

(65) Prior Publication Data

US 2001/0054675 A1 Dec. 27, 2001

Related U.S. Application Data

(62) Division of application No. 08/490,819, filed on Jun. 15, 1995, now Pat. No. 6,220,563.

(51) Int. Cl.[7] ............................................. F16M 13/00
(52) U.S. Cl. .................. 248/609; 248/560; 248/602; 248/580; 267/52; 267/242
(58) Field of Search ....................... 248/560, 581, 248/602, 678, 571, 675, 672, 676, 562, 611, 619, 424; 52/167.1, 167.2; 267/234, 52, 242, 243

(56) References Cited

U.S. PATENT DOCUMENTS

| 382,207 A | 5/1888 | Barrow |
|---|---|---|
| 929,118 A | 7/1909 | Buckwalter |
| 1,072,526 A | 9/1913 | Stiles |
| 1,781,517 A | 11/1930 | McKeown |
| 2,021,370 A | 11/1935 | Mallay |
| 2,058,185 A | 10/1936 | Simon |
| 2,945,248 A | 7/1960 | Meagher |
| 3,244,393 A | 4/1966 | Wallerstein, Jr. |
| 3,784,146 A | 1/1974 | Matthews |
| 3,848,842 A | 11/1974 | Jepsen |
| 3,906,689 A | 9/1975 | Nakayama |
| 4,004,766 A | 1/1977 | Long |
| 4,140,292 A | 2/1979 | Kaigler, Jr. |
| 4,496,130 A | 1/1985 | Toyama |
| 4,946,128 A | 8/1990 | Cunningham |
| 5,205,528 A | 4/1993 | Cunningham |
| 5,556,064 A | 9/1996 | Cowe |
| 6,220,563 B1 * | 4/2001 | Cunningham ............... 248/580 |

FOREIGN PATENT DOCUMENTS

| JP | 2-102945 | 4/1990 |
|---|---|---|

* cited by examiner

*Primary Examiner*—Kimberly Wood
(74) *Attorney, Agent, or Firm*—Porter, Wright, Morris & Arthur, LLP

(57) ABSTRACT

A vibration isolator including a bearing support and an elastic member that communicates with a vibration source. The elastic member is capable of bending from an original position to assume a more or less bowed position in response to changes in a load applied to the midportion of the elastic member intermediate its ends and returning essentially to its original position when the original load is restored. The elastic member engages a friction-resistant bearing surface on the bearing support at a distance spaced from each of its ends and moves relative to the bearing surface in response to a bending of the elastic member. The apparatus may be tuned to effectively isolate a particular vibration frequency, for example, by altering the properties of the elastic member or by changing the distance between the points on the bearing support that engage the elastic member.

11 Claims, 8 Drawing Sheets

VIBRATION ISOLATION DEVICE AND METHOD

This is a division of U.S. application Ser. No. 08/490,819, filed Jun. 15, 1995 now U.S. Pat. No. 6,220,563.

BACKGROUND AND SUMMARY OF THE INVENTION

The present invention relates to a device and method for isolating a vibration source from its environment.

Homeostatic systems, such as the system disclosed in U.S. Pat. No. 4,946,128 to Cunningham, have been used to absorb shocks resulting from application of external forces to the systems. In these systems, an elastic member, capable of bending to assume a more or less bowed position in proportion to the magnitude of a load applied to its midportion, is supported at a distance from its ends on a fixed bearing support. The ends of the elastic member slide in channels, grooves or sleeves relative to the points of support as the force applied to the member varies and the elastic member bends in response to this applied force. The channels, grooves or sleeves are made of friction-producing materials such that energy added to the system by the applied force may be dissipated as heat. Such systems are capable of providing shock absorbing functions only when the elastic member engages the bearing support at an angle within a critical range and the energy added to the system by the shock(s) is dissipated outside the system.

These systems, however, are not suited for use in isolating a vibration source from its environment because the frictional engagement of the elastic members by the bearing surfaces, which is required to performance of the shock absorbing function, may transfer vibration from the loaded elastic member to a bearing support. The critical angle limitations present in shock absorbing systems also unduly limit vibration isolation systems. In addition, the heat buildup associated with the frictional energy dissipation of homeostatic shock-absorbing systems may be undesirable in some vibration isolation applications.

A need exists for a device that is capable of isolating a vibration source from its environment, and that is capable of operating under a wide range of vibration frequencies and amplitudes.

It is an object of the present invention to provide an apparatus and method for isolating a vibration source from its environment.

It is another object of the invention to provide an apparatus and method that is capable of isolating vibration over a wide range of frequencies and amplitudes, including, but not limited to, vibration frequencies as low as one hertz (Hz) or less, and particularly an apparatus that may be tuned to effectively respond to a particular source vibration frequency.

It is a further object of the invention to provide an apparatus and method that is capable of minimizing the energy that is lost by the apparatus and its vibration source, and that does not generate appreciable amounts of heat.

It is yet another object of this invention to provide an apparatus and method for isolating a vibration source from its environment in which the vibration source is placed in communication with an elastic member that engages its bearing supports in an essentially frictionless manner over a wide range of engagement angles.

The foregoing objectives are achieved in an apparatus and method that isolate a vibration source from its environment and are effective over a wide range of vibration frequencies and amplitudes. The present invention accomplishes these objectives by minimizing the energy that is lost by the apparatus and its vibration source, such that the apparatus and method do not generate appreciable amounts of heat. The present invention includes a bearing support and an elastic member that may be placed in communication with a vibration source. The elastic member is capable of bending from an original position to assume a more or less bowed position in response to changes in a load applied to the midportion of the elastic member intermediate its ends and returning essentially to its original position when the original load is restored. The elastic member engages a friction-resistant surface on the bearing support at a distance spaced from each of its ends, and moves relative to the bearing surface in response to a bending of the elastic member. The effectiveness of the vibration isolation increases as the friction between the elastic member and the bearing surface decreases, preventing the transfer of energy from the vibration source to the bearing support through the elastic member. The apparatus may be tuned to effectively respond to a particular source vibration frequency, for example, by altering the properties of the elastic member or by changing the distance between the points on the bearing support that engage the elastic member.

These and further objects of the invention will become apparent from the following detailed description.

DETAILED DESCRIPTION OF THE PREFERRED EMBODIMENT(S)

Figure 1:
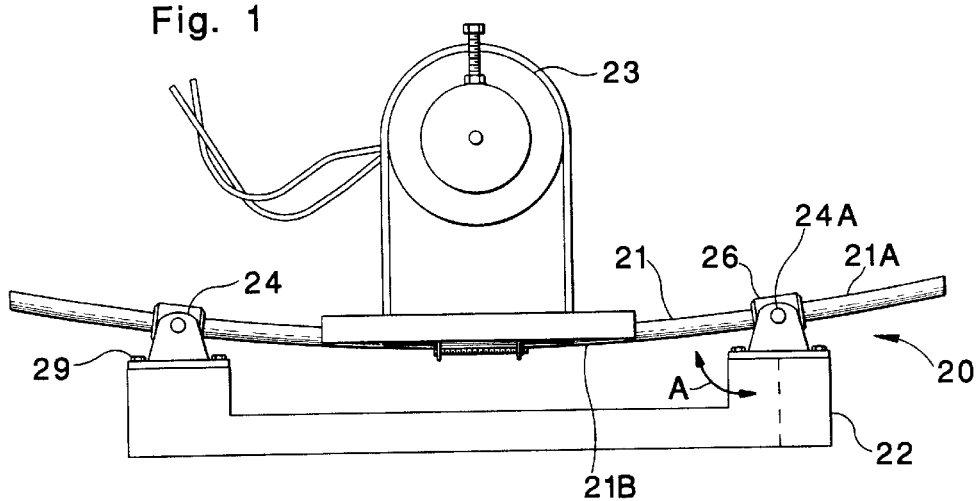
FIG. 1 is a schematic side elevational view of a vibration isolation apparatus according to the present invention.

FIG. 1 is a schematic representation of the system 20 of the present invention. An elongated elastic member 21 is supported solely on a bearing support 22. The elastic member 21 is capable of deflecting from an original position to a more or less bowed position in response to changes in a load in communication with the midportion 21B of the elastic member 21 intermediate its ends 21A, with the amount of the deflection being dependent on the magnitude of the applied force within the load-bearing capacity of the member 21. The elastic member 21 also is capable of returning essentially to its original position when the original force acting on the elastic member 21 is restored.

Figure 13:
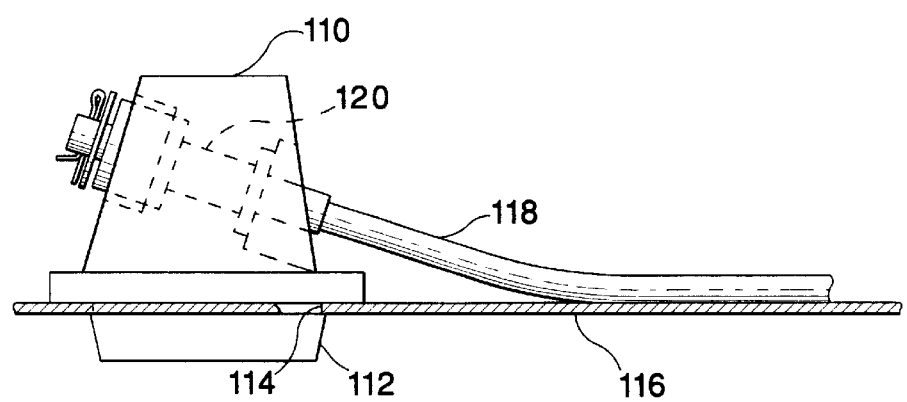
FIG. 13 is a partial side elevational view of a bearing structure according to the present invention, particularly illustrating a snap-in base.

The bearing support 22 engages the elastic member 21 at a distance spaced from the longitudinally unrestrained ends 21A of the elastic member. The bearing support 22 may be provided with a bearing structure 24 designed to accommodate the shape and dimensions of the elastic member and reduce friction between the bearing structure 24 and the elastic member 21. The bearing structure 24 may be a discrete element connected to the bearing support 22. By way of example, FIG. 1 shows a bearing structure 24 connected to the bearing support 22 by bolts or other fasteners 29, and FIG. 13 shows a bearing structure 110 provided with a base 112 capable of snapping into a recess 114 in a bearing support 116 Alternatively, the bearing structure 24 may be formed integrally with the bearing support 22 (not shown in the drawings).

Figure 1A:
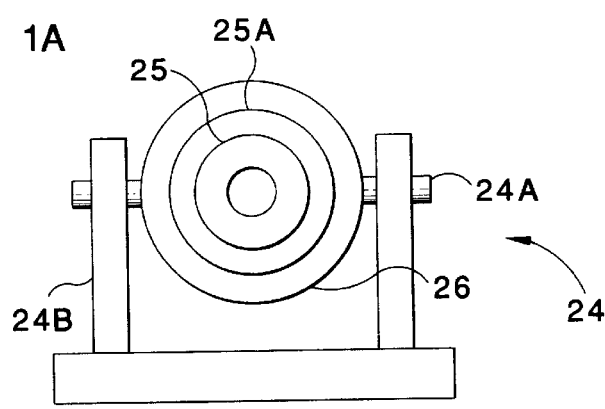
FIG. 1A is an end sectional view of the bearing structure of the vibration isolation apparatus of FIG. 1.
Figure 1B:
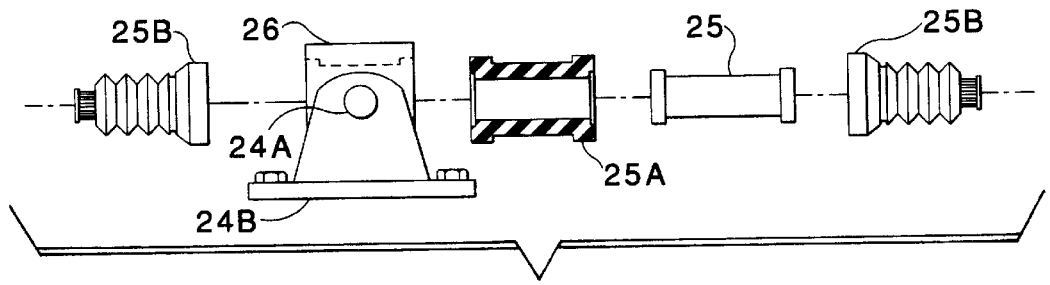
FIG. 1B is an exploded side view of the bearing structure of FIG. 1A.

FIGS. 1A and 1B show a bearing structure 24 suitable for use in the present invention. The bearing structure 24 includes a bearing mount 26 supported on a mounting bracket 24B. Pivot pin 24A pivotally connects the bearing mount 26 to the mounting bracket 24B. The bearing mount 26 supports a bearing surface 25 that engages the elastic member 21. The bearing surfaces 25 may take the form of elongated bearing sleeves, best shown in FIG. 1B. The bearing surfaces and bearing mounts also may take the form of open channels, not shown in the drawings. Each of the bearing surfaces 25 receives an end 21A of the elastic member 21. The bearing mounts 26 pivot relative to the bearing support 22 in response to the bending of the elastic member 21. Protective boots 25B, shown in FIG. 1B, may extend laterally from the bearing structure 24 in covering relationship to the parts of the elastic member 21 that may engage the bearing surfaces 25 to prevent the entry of dust or debris, which may increase friction between the bearing sleeves 25 and the elastic member 21.

Returning now to FIG. 1, a vibration source 23, such as a motor or turbine, may be placed in communication with the elastic member 21. The elastic member bends in response to the vibration transmitted to it by the vibration source 23. Variations in the load 23 applied to the elastic member 21 cause the elastic member 21 to bear on its bearing support 22 at different positions along the ends 21A of the elastic member 21. As the load 23 on the elastic member 21 exerts a downward force and the elastic member 21 bows downwardly in response to this load 23, the length of the midportion 21B of the elastic member 21 extending between the opposing bearing structures 24 increases beyond any dimension caused solely by thermal expansion and contraction. The length of the midportion 21B correspondingly decreases when the downwardly directed force associated with the load 23 is reduced and the elastic member 21 bows upwardly in response.

Variations in the load 23 applied to the elastic member 21 also cause the elastic member 21 to bear on its support 22 at different angles relative to the support 22. For purposes of the invention, it has been found that an engagement angle A (see FIG. 1) within the range of about 0 degrees to about 90 degrees (and all ranges subsumed therein) will provide effective isolation of a vibration source in communication with the elastic member. As a load 23 exerts a downward force on the elastic member 21 and the elastic member 21 bends downwardly in response, the force applied to the support 22 changes from a vertical to an increasingly horizontally oriented, outwardly directed force.

Facile sliding movement of the elastic member 21 relative to the bearing surfaces 25 in response to the vibration of the source 23 minimizes the transfer of energy from the vibration source 23 to the bearing support 22 through the elastic member 21. Advantageously, the elements of the vibration isolator are selected to minimize friction between the elastic member 21 and the bearing surfaces 25 when the elastic member 21 moves against the bearing surfaces 25 in response to bending of the elastic member 21. With some vibration isolators, the elastic member 21 may engage the bearing surface 25 under ideal, essentially frictionless conditions, resulting in extremely effective vibration isolation. When the elastic member 21 engages the bearing surfaces 25 under less than ideal conditions, proportionally more vibration may be transmitted from the vibration source through the elastic member 21 to the bearing surfaces 25 and the bearing support 22. The transmission of such vibration may be reduced by providing a shock-absorbing spacer 25A of rubber or other suitable material between the bearing sleeve 25 and the bearing mount 26, as shown in FIGS. 1A and 1B. Shock absorbing materials also may be interposed between the bearing structure and the bearing support (not shown in the drawings) to reduce the transmission of vibration resulting from nonideal engagement of the elastic member 21 and the bearing surfaces 25.

To minimize friction between the elastic member 21 and the bearing surfaces 25, a friction-resistant interface may be provided between the exterior surface of the ends 21A of the elastic member 21 and the interior surface of the bearing sleeves 25 or channels. This may be accomplished by providing materials and finishes, including, but not limited to, fluoropolymers and highly polished metals, for the exterior surface of the ends 21A and/or the interior surface of the sleeves 25 so that these elements slide easily relative to one another. Alternatively, or in addition to the above, lubricants or a stream of air or other gas may be interposed between the ends 21A of the elastic member and the bearing surfaces 25 to reduce the friction therebetween.

An elastic member 21 of the invention may be formed from any suitable material, including metal, elastomers, and composite materials, which allows it to deflect in response to changes in the applied load and return essentially to its original position when the original load is restored. When the applied force is exerted primarily back and forth within a single plane, the elastic member need not be capable of bending in a multitude of different directions so long as it is capable of bending in the direction(s) responsive to the applied force. The elastic member should be selected to have a static deflection appropriate for the anticipated load, with greater static deflection being required to isolate lower frequency vibrations. The vibration isolator of the present invention is capable of effective isolation of frequencies as low as 1 Hz or less if an elastic member having a suitably large static deflection is used.

Figure 2:
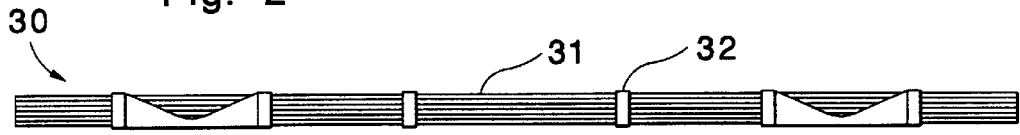
FIG. 2 is a side elevational view of a composite elastic member.
Figure 2A:
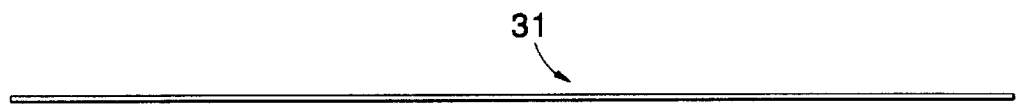
FIG. 2A is a side elevational view of a single subunit of the composite elastic member of FIG. 2.
Figure 2B:
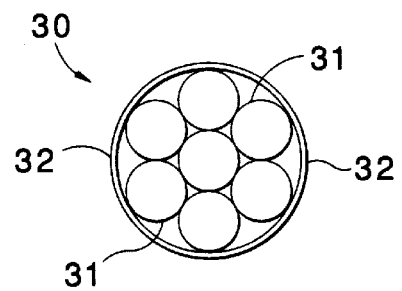
FIG. 2B is an end sectional view of the composite elastic member of FIG. 2.

The elastic members may be unitary members of continuous construction, as shown in FIG. 1. The elastic members 21 may be of hollow or solid cross-section of any appropriate shape or dimension, including, but not limited to, solid rods, hollow tubes, or I-beams (shown in FIGS. 3 and 3A). They also may be composite members 30 comprising a bundle of continuous elastic subunits 31 held together by one or more restraining bands 32 disposed at predetermined distances along the composite member 30, as shown in FIG. 2. FIG. 2A shows a single subunit 31 of the composite member 30 of FIG. 2. As with unitary elastic members 21, the composite members 30 and their subunits 31 may be of hollow or solid cross-section of any appropriate shape or dimension, such as the exemplary cross section shown in FIG. 2B.

Figure 6:
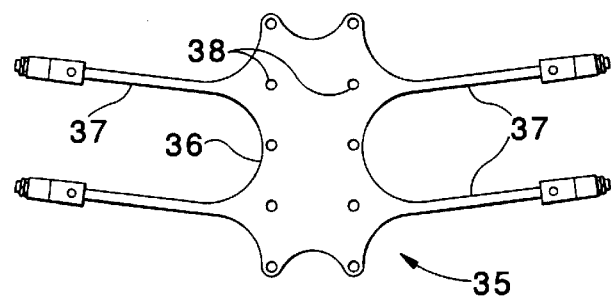
FIG. 6 is a schematic side elevational view of a combination elastic member, particularly illustrating the vertical relationship of the elastic members.

The elastic member also may be a combination member 35, as shown in FIG. 6. The combination member may have a central platform 36 sized to accommodate the anticipated load. The platform 36 has opposite sides with at least one elastic member 37 in communication with each side of the platform 36. The elastic members 37 may be integral to the platform 36, or they may be separate elements attached to the platform by suitable connectors (not shown in the drawings). The elasticity of the platform 36 may differ from that of the elastic members 37, provided that the elastic members 37 have the characteristics described above. Bores 38 may be provided in the platform 36 for mounting the vibration source.

Figure 3:
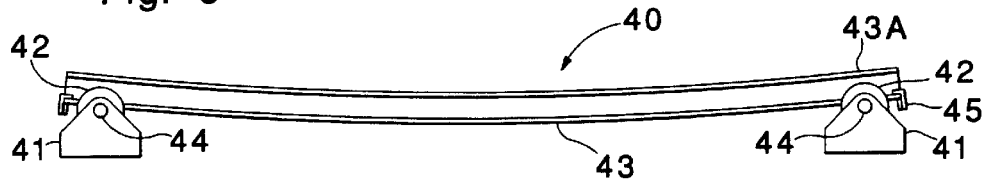
FIG. 3 is a schematic side elevational view of a vibration isolation apparatus according to the present invention.
Figure 3A:
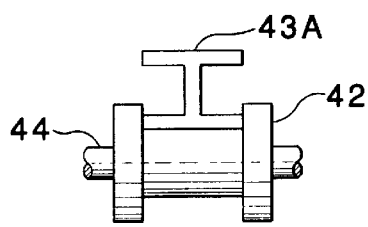
FIG. 3A is an end view of the vibration isolation apparatus of FIG. 3.
Figure 14:
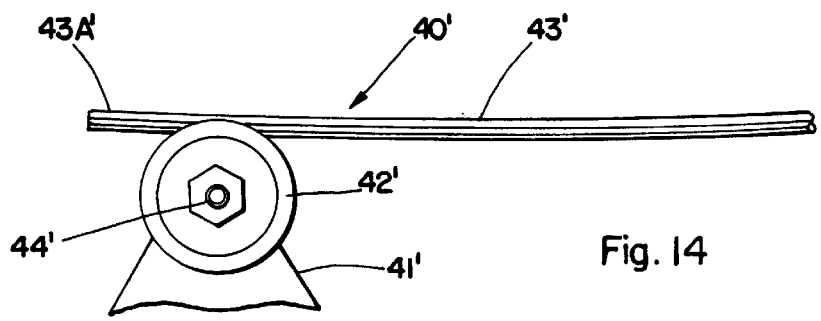
FIG. 14 is a partial schematic side elevational view of a vibration isolation apparatus according to the present invention.
Figure 15:
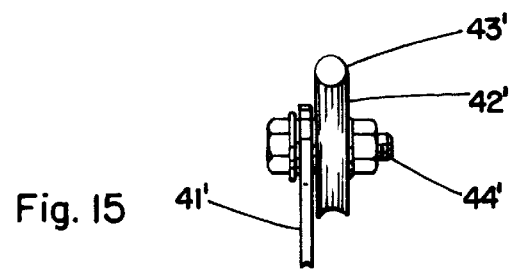
FIG. 15 is an end view of the vibration isolation apparatus of FIG. 14.

The bearing structure 24 may be of any suitable design and composition that allows an elastic member 21 to engage bearing surfaces 25 over a wide range of engagement angles A while minimizing friction between the elastic member 21 and the bearing surfaces 25, as shown in FIG. 1A. FIGS. 3 and 3A show a vibration isolator 40 including a bearing support 41 in which the bearing structures 42 comprise notched-wheel ball bearings pivotally attached to the bearing support 41 by pivot pin 44. The ends 43A of the elastic member 43 are supported on the grooved portion of the ball bearings. The ball bearings rotate in response to the bending of the elastic member 43. The end 43A of the elastic member 43 may be provided with a stop 45 to limit the longitudinal movement of the end 43A toward the bearing structure 44. FIGS. 14 and 15 show an alternative embodiment of a vibration isolator 40' including a bearing support 41' in which the bearing structure 42' comprises a grooved ball bearing pivotally attached to the bearing support 41' by pivot pin 44'. The bearing structure 42' supports end 43A' of elastic member 43'.

Figure 4:
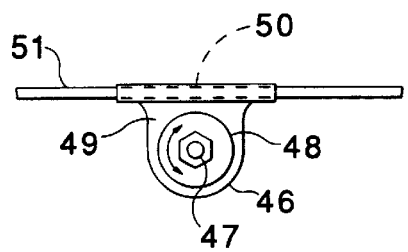
FIG. 4 is a side detail view of an alternative embodiment of the bearing structure of FIG. 3, particularly illustrating a bearing sleeve.

FIG. 4 shows an alternative embodiment of a bearing structure 46 that may be pivotally attached to a bearing support by pivot pin 47. The bearing structure 46 includes a ball bearing 48 on which a shaft 49 may rotate. The shaft 49 is connected to a sleeve 50 that may receive the end 51 of a elastic member. The sleeve 50 is capable of maintaining the elastic member 51 in a desired position relative to the bearing structure 46, but is not capable of providing substantial frictional engagement of the elastic member.

If suitable friction-resistant materials and/or lubricants are used, satisfactory vibration isolation also may be achieved using a bearing structure 110 that is fixedly connected to the bearing support 116, as shown in FIG. 13. The elastic member 118 slides relative to the bearing sleeve 120 provided within the fixed bearing structure 110.

Figure 5:
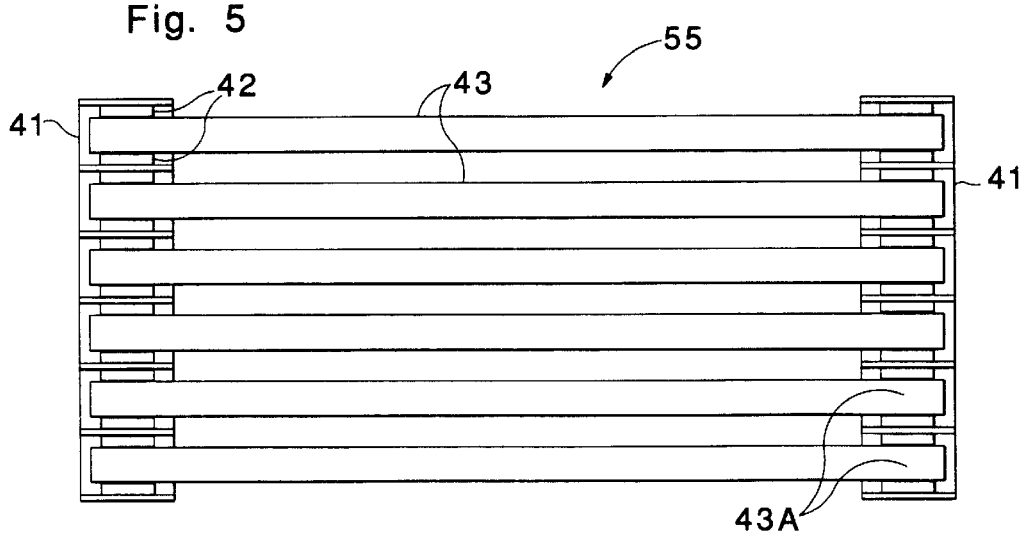
FIG. 5 is a top plan view of a plurality of adjacent vibration isolation apparatuses of FIG. 3.

Effective vibration isolation may be achieved in an apparatus having a single elastic member in communication with the vibration sources. Advantageously, however, the vibration source is placed in communication with a plurality of spaced elastic members, each supported on a bearing support, as shown in FIG. 5. The vibration isolation system 55 includes a bearing support 41 in which the bearing surfaces 42 of the bearing structure comprise grooved-wheel ball bearings pivotally attached to the bearing support 41. The ends 43A of the elastic member 43 are supported on the grooved portion of the ball bearings. The system 55, with the elastic member 43 taking the form of an I-beam, is particularly suited for use with large loads. A sufficient number of elastic members 43 should be used so that none of them is stressed beyond its elastic limit, and thus, all of them will tend to return to their respective original unloaded positions when the applied load is removed. The plurality of elastomeric supports in such a system may be arranged horizontally, as shown in FIG. 5, or vertically, as shown in FIG. 6. Arrangements of elastic members other than those depicted herein (for example, a horizontal arrangement of elastic members in which the members are oriented transversely to one another) also are within the scope of the invention.

Figure 7:
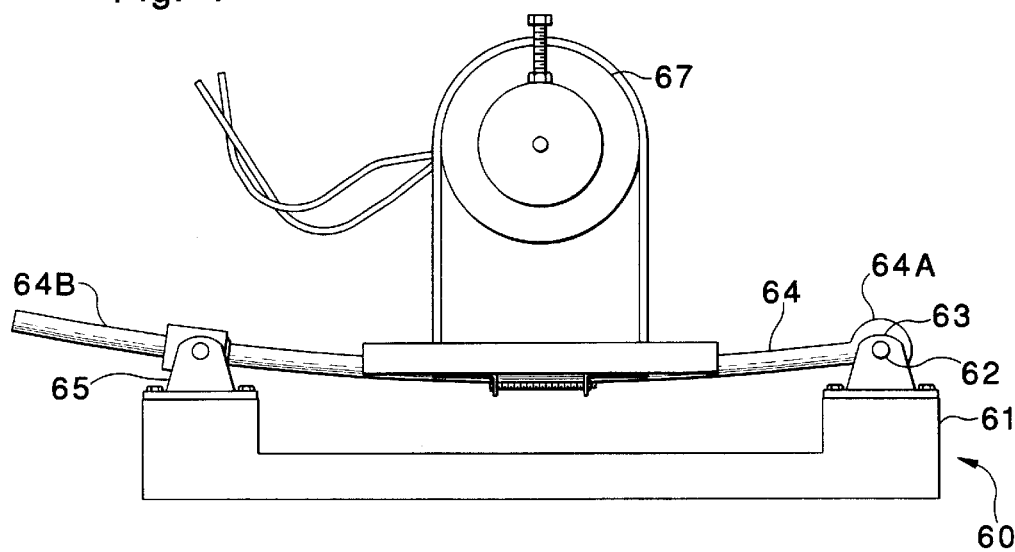
FIG. 7 is a schematic side elevational view of a vibration isolation apparatus according to the present invention, particularly illustrating an end of the elastic member being connected to the bearing support by a pin swivel.

The ends of the elastic members need not be supported in the same fashion at each end. For example, FIG. 7 shows a vibration isolator 60 of the present invention in which the bearing support 61 includes a pin 62 that extends substantially horizontally relative to the bearing support 61. A bore 63 is provided transversely through an end 64A of the elastic member 64 in which the pin 62 may be received. The other end 64B of the elastic member 64 may be supported, for example, on the pivotally connected bearing structure 65 shown in FIG. 1. The elastic member 64 may travel transversely along the pin 62 in response to the vibration of the source 67 in communication with the elastic member 64.

The frequency response of the vibration isolator of the present invention may be adjusted by changing the characteristics of the elastic member or by moving the bearing points in or out relative to the ends of the elastic members. In this way, the isolator may be tuned to effectively respond to the source frequency. The tuning may be accomplished by providing a plurality of elastic members having different elasticities and selecting one or more of the plurality of elastic members having a static deflection suitable to the anticipated vibration frequency of the source.

Figure 8:
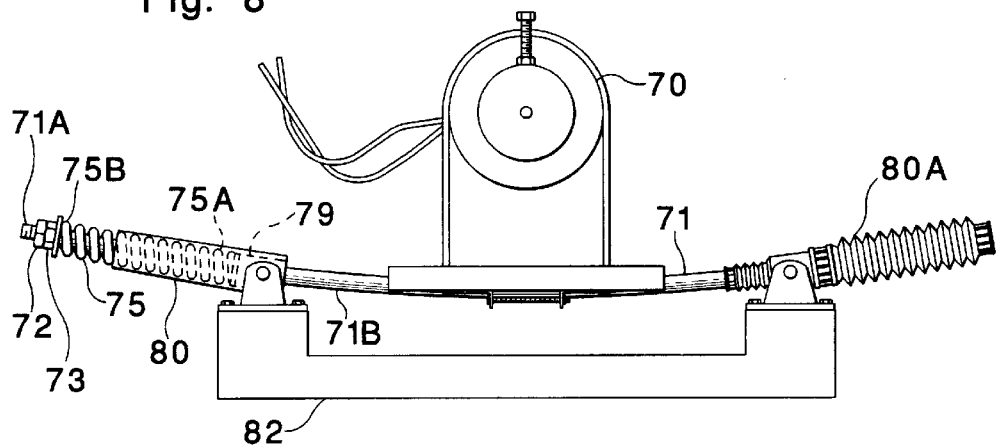
FIG. 8 is a schematic side elevational view of a vibration isolation apparatus according to the present invention, particularly illustrating an elastic member including a spring tensioning device.

The apparatus also may be tuned to respond to a particular source frequency by altering the tension of a single elastic member. This may be accomplished, for example, by providing a spring 75 in communication with an end 71A of the elastic member 71 exterior of the bearing structure 80, as shown in FIG. 8. The inner end 75A of the spring communicates with the bearing sleeve 79, shown in phantom. The outer end 75B of the spring communicates with a moveable tensioning nut or like structure 73 capable of exerting a variable force against the outer end 75B of the spring in opposition to the tensile force exerted by the spring 75. The tensioning nut 73 may be secured in a desired position by lock nut 72. Tightening of the nut 73 (i.e., moving it toward the vibration source 70) causes the spring 75 to be compressed. This decreases the effective static deflection of the elastic member 71, because a vibration source 70 acting against the midportion 71B of the elastic member 71 must overcome the force exerted by the compressed spring 75 against the bearing sleeve 79 to bend the elastic member 71. Thus, a more powerful vibration source would be required to cause bending of an elastic member in communication with a compressed spring than that required to cause bending of an elastic member in communication with an uncompressed spring (or an elastic member lacking a spring altogether). Although this tuning method provides a simple and inexpensive method of adjusting the response of a vibration isolator, and particularly a method that is suitable for use in retrofitting an existing vibration isolator, it may, however, decrease the effectiveness of the vibration isolation response by increasing friction between the elastic member and its bearing surface.

Figure 9:
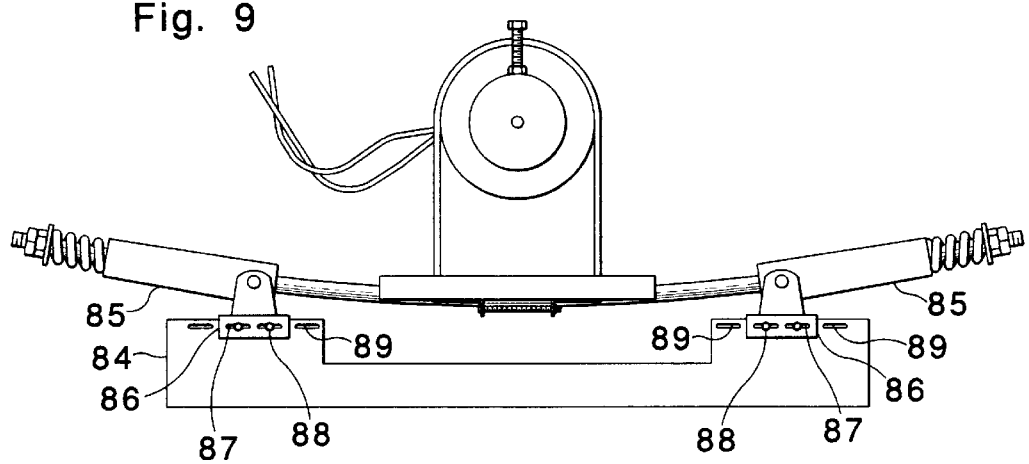
FIG. 9 is a schematic side elevational view of a vibration isolation apparatus according to the present invention, particularly illustrating adjustably moveable bearing structures.
Figure 9A:
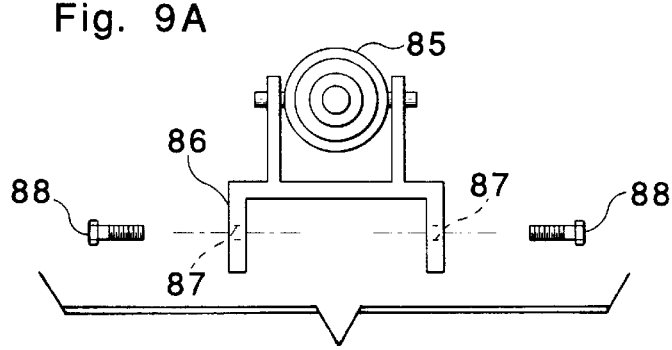
FIG. 9A is an exploded end sectional view of the bearing structure of FIG. 9.

The tuning also may be accomplished by providing a bearing surface in which the bearing structures are adjustably moveable relative to one another FIG. 9 shows an embodiment of the invention in which a bearing structure 85 is adjustably moveable on its bearing support 84. This may be accomplished by providing the bearing structure 85 with a bracket 86 that defines a slot or bore 87. The bearing support 84 may define a plurality of corresponding slots or bores 89, each being laterally spaced at a distance from an adjacent slot or bore. The bearing structure 85 may be positioned on the bearing support 84 by aligning the slots 87 of the bracket 86 in a desired position relative to a slot 89 of the bearing support 84. The bearing structure 85 and the bearing support 84 may be secured in a desired position by inserting a pin or other suitable fastener 88 through the respective slots 87, 89. FIG. 9A shows an exploded end sectional view of the bearing structure of FIG. 9.

Bearing structures of the type shown in FIG. 13 also may be used with a bearing support 116 having a plurality of laterally spaced apart recesses 114 (only one of which is shown in the drawings). The bearing structure 110 is inserted into a recess 114 spaced a desired distance apart from an opposing bearing structure.

Figure 10:
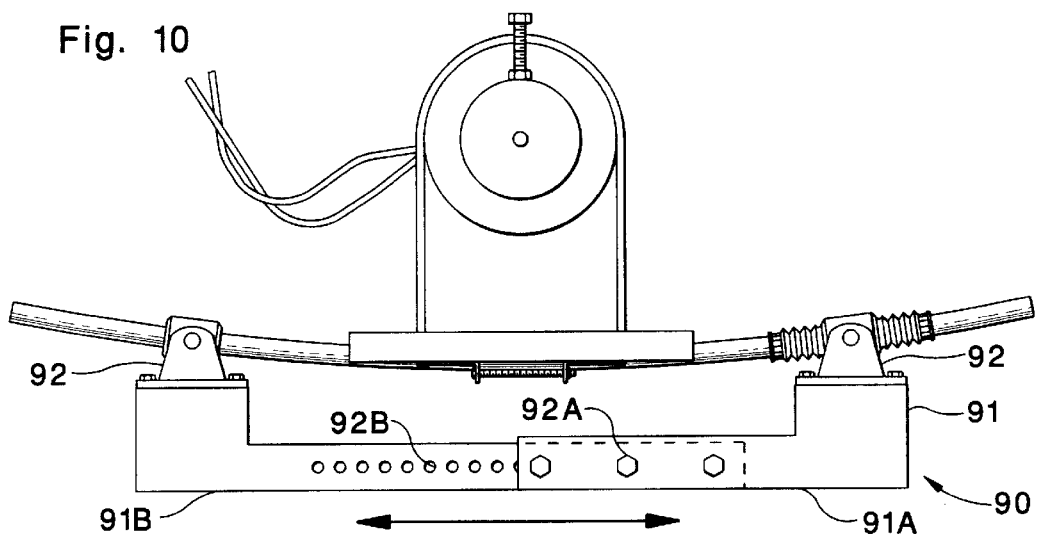
FIG. 10 is a schematic side elevational view of a vibration isolation apparatus according to the present invention, particularly illustrating a manually adjustable two-part bearing support frame.
Figure 11:
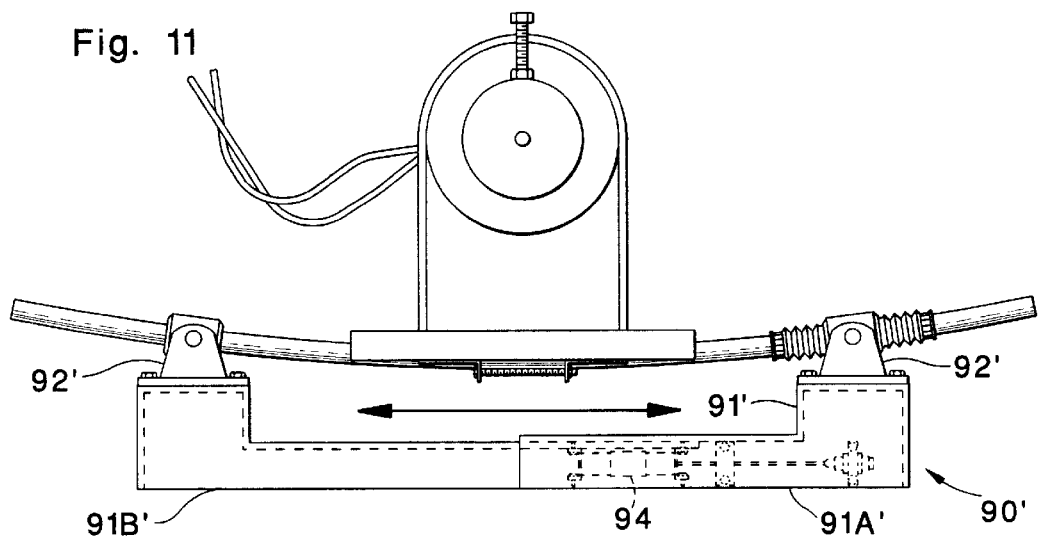
FIG. 11 is a schematic side elevational view of a vibration isolation apparatus according to the present invention, particularly illustrating a mechanically adjustable two-part bearing support frame, with a motor and screw drive for moving the frame shown in phantom.

Another embodiment of the invention 90, shown in FIGS. 10 and 11, makes use of a two-part bearing support 91. A bearing structure 92 is provided on each part of the support 91. The right bearing support 91A may be adjustably moveable relative to the left bearing support member 91B, as shown by the arrows. The parts of the bearing support 91 may be secured in a desired position, for example, by bolts or other fasteners inserted though bores 92A, 92B.

Figure 11A:
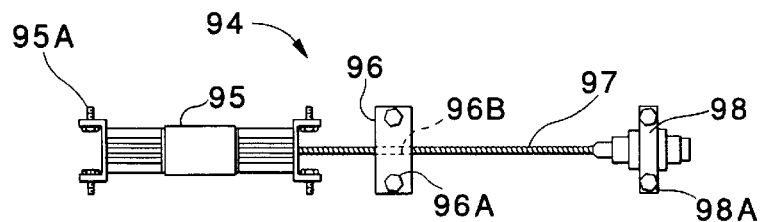
FIG. 11A is a side detail view of the motor and screw drive of FIG. 10.
Figure 16:
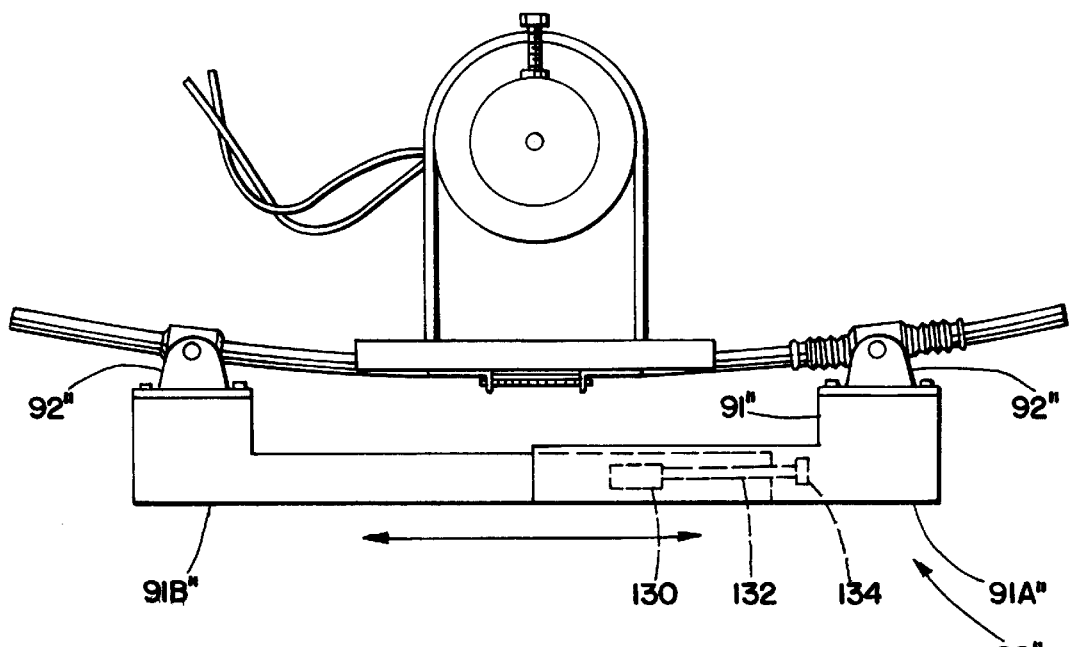
FIG. 16 is a schematic side elevational view of a vibration isolation apparatus according to the present invention, particularly illustrating a mechanically adjustable two-part bearing support frame, with a pressure source and piston for moving the frame shown in phantom.

Advantageously, the bearing support frame 91' may be provided with a mechanical device for moving the parts of the support frame 91A', 91B', as shown in FIG. 11. The device may take the form of a drive motor and screw drive 94, shown in phantom, that extend between the left 91B' and right 91A' sides of the frame 91'. FIG. 11A is a detail view of the drive motor and screw drive 94. The motor 95 is secured to the left side 91B by fasteners 95A and a drive block 96 is secured to the right side 91A by fasteners 96A. The drive block 96 defines a threaded bore 96B in communication with screw drive 97, which extends from the motor 95 to an idler support 98 connected to the right side 91A by fasteners 98A. The motor 95 causes the screw drive 97 to rotate, which moves the right side 91A of the bearing support 91 laterally relative to the left side 91B. The motor 95 may be controlled manually or by a sensor, not shown in the drawings, in communication with the load. Alternatively, as shown in FIG. 16, the device may take the form of a hydraulic or pneumatic cylinder 130, rod 132, and piston 134 that extend between the left and right frame sides.

Figure 12:
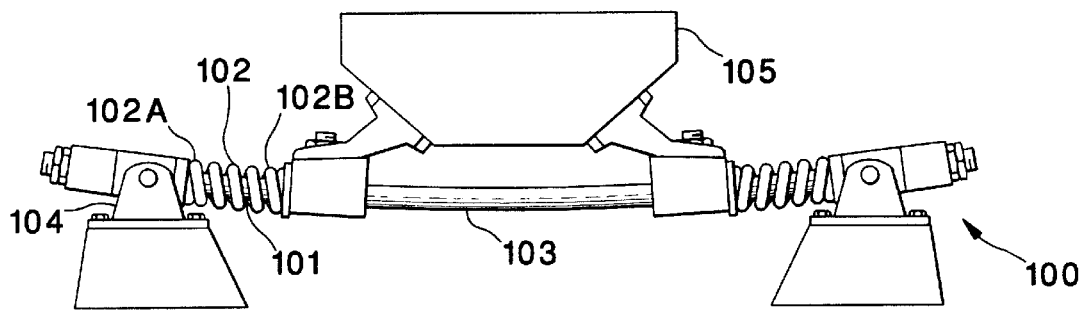
FIG. 12 is a schematic side elevational view of a vibration isolation apparatus according to the present invention, particularly illustrating a device for centering a load on the elastic member.

The vibration isolator of the present invention may include a centering mechanism to aid in positioning the load on the elastic member. As shown in FIG. 12, the centering mechanism 101 on the vibration isolator 100 may take the form of springs 102 having a first end 102A connected to the elastic member 103 interior of the bearing support point 104 and a second end 102B adjacent to the vibration source 105. The springs 102 tend to urge the load 105 toward the center of the elastic member 103, preventing the vibration source 105 from moving toward either side of the elastic member 103 as it vibrates.

Although a specific embodiment of the invention has been described herein in detail, it is understood that variations may be made thereto by those skilled in the art without departing from the spirit of the invention or the scope of the appended claims.

What is claimed is:

1. A vibration isolation apparatus, comprising:

a bearing support having left and right sides;

a first bearing surface attached to the left side of said bearing support;

a second bearing surface attached to the right side of said bearing support;

an elastic member having opposing ends and a midportion intermediate said ends, said elastic member being capable of bending from an original position to assume a more or less bowed position in response to changes in a load applied to the midportion of said elastic member, said elastic member engaging said first and second bearing surfaces at a distance spaced from corresponding ends of said elastic member, said elastic member cooperating with said bearing surfaces to allow oscillation of said elastic member at a predetermined frequency in response to vibration of a load applied to said elastic member, the right side of said bearing support being adjustably movable relative to the left side of said bearing support while said elastic member is under load, said movement of the right side relative to the left side altering the frequency at which said elastic member responds to the vibration of the load.

2. The vibration isolation apparatus of claim 1, further including:

a device causing the right side of said bearing support to move laterally relative to the left side of said bearing support.

3. The vibration isolation apparatus of claim further including:
    means for laterally moving the right side of said bearing support relative to the left side of said bearing support.

4. The vibration isolation apparatus of claim 1, wherein the right side of said bearing support is continuously moveable within a predetermined range relative to the left side of said bearing support.

5. A vibration isolation apparatus, comprising:
    a bearing support having left and right sides, each of the left and right sides including a bearing surface;
    an elastic member having opposing ends and a midportion intermediate said ends, said elastic member being capable of bending from an original position to assume a more or less bowed position in response to changes in a load applied to the midportion of said elastic member, said elastic member engaging said left and right bearing surfaces at a distance spaced from corresponding ends of said elastic member, said elastic member and said bearing surfaces cooperating to allow oscillation of said elastic member at a predetermined frequency in response to vibration of a load applied to said elastic member, said right bearing surface being laterally adjustably movable relative to said left bearing surface while said elastic member is under load, said movement of said right bearing surface relative to said left bearing surface altering the frequency at which said elastic member responds to vibration of the load.

6. The vibration isolation apparatus of claim 5, further including:
    a device causing said right bearing surface to move laterally relative to said left bearing surface.

7. The vibration isolation apparatus of claim 5, further including:
    means for laterally moving said right bearing surface relative to said left bearing surface.

8. The vibration isolation apparatus of claim 5, wherein said right bearing surface is continuously moveable within a predetermined range relative to said left bearing surface.

9. A method for isolating a vibration source from its environment, said method comprising the steps of:
    providing a bearing support having left and right sides;
    providing a first bearing surface on said left side of said bearing support, said first bearing surface being capable of engaging an elastic member;
    providing a second bearing surface on said right side of said bearing support, said second bearing surface being capable of engaging an elastic member and being laterally moveable relative to said first bearing surface;
    selecting a elastic member having opposing ends and a midportion intermediate said ends, said elastic member being capable of bending from an original position to assume a more or less bowed position in response to a load applied to the midportion of said elastic member;
    causing said elastic member to engage said first and second bearing surfaces at a distance spaced from corresponding ends of said elastic member such that said elastic member and said bearing surfaces cooperate to allow oscillation of said elastic member at a predetermined frequency in response to vibration of a load applied to said elastic member;
    applying a load to the midportion of said elastic member; and
    moving said second bearing surface relative to said first bearing surface while the elastic member is under load, said movement altering the frequency at which said elastic member responds to the vibration of the load.

10. The vibration isolation method of claim 9, wherein the step of providing a second bearing surface further includes the step of:
    providing a second bearing surface capable of being continuously moveable within a predetermined range relative to said first bearing surface.

11. The vibration isolation method of claim 9, wherein the step of causing said elastic member to engage said bearing surfaces further includes the step of:
    causing said elastic member to engage said first and second bearing surfaces such that a minimal amount of energy is transferred from a vibrating load to said bearing support.

* * * * *

UNITED STATES PATENT AND TRADEMARK OFFICE
CERTIFICATE OF CORRECTION

PATENT NO.      : 6,595,483 B2
DATED           : July 22, 2003
INVENTOR(S)     : John Cunningham It is certified that error appears in the above-identified patent and that said Letters Patent is hereby corrected as shown below:

<u>Column 9,</u>
Line 1, should read -- claim 1, further --.

Signed and Sealed this

Twenty-seventh Day of January, 2004

JON W. DUDAS
*Acting Director of the United States Patent and Trademark Office*